United States Patent [19]
Toyomoto et al.

[11] 4,021,051
[45] May 3, 1977

[54] CHUCK FOR MACHINE TOOLS

[75] Inventors: Yoshitaka Toyomoto, Neyagawa; Noboru Kawasaki, Katano, both of Japan

[73] Assignee: Yutaka Seiko Kabushiki Kaisha, Osaka, Japan

[22] Filed: Dec. 17, 1975

[21] Appl. No.: 641,823

[30] Foreign Application Priority Data

Mar. 8, 1975 Japan .................. 50-31631[U]

[52] U.S. Cl. .................. 279/1 N; 90/11 A; 279/103

[51] Int. Cl.² .................. B23B 31/04

[58] Field of Search .......... 279/1 N, 1 T, 1 TS, 279/9 R, 96, 102, 103; 90/11 A

[56] References Cited

FOREIGN PATENTS OR APPLICATIONS 931,452   7/1955   Germany .................. 279/1 N
44-23894  10/1969  Japan .................... 279/1 N Primary Examiner—Frank T. Yost
Assistant Examiner—Z. R. Bilinsky
Attorney, Agent, or Firm—Birch, Stewart, Kolasch and Birch

[57] ABSTRACT

There is disclosed a chuck adapted to be attached to the spindle of a machine tool, for gripping an intended tool, comprising a chuck barrel adapted to grip an intended tool and having a conical outer peripheral surface and not having slots extending along the generating lines thereof, a clamp ring fitted over said chuck barrel, and a number of rollable bodies in the form of needle rollers interposed between said clamp ring and said chuck barrel and inclined at a fixed angle with respect to the generating lines, the arrangement being such that when said clamp ring is manipulated for rotation, said rollable bodies spirally revolve around the axis of the chuck barrel along the conical peripheral surface thereof while rotating around their own axes, thereby effecting the contraction and configurational restoration of the chuck barrel, said chuck being characterized in that a restraining ring is attached to the outer peripheral surface of said clamp ring and rollable bodies, particularly in the form of needle rollers, are interposed between said restraining ring and said clamp ring, thereby restraining said chuck barrel from developing a flection deformation when said chuck barrel is contracted and restraining said clamp ring from developing a restoration deformation as it tends to radially expand by the reaction due to the contracting force, thereby increasing the power for gripping the tool.

6 Claims, 5 Drawing Figures

CHUCK FOR MACHINE TOOLS

SUMMARY OF THE INVENTION

The present invention relates to improvements in a chuck adapted to be attached to the spindle of a machine tool, for gripping an intended tool.

One such chuck is disclosed in German Pat. No. 931,452. Thus, this patent relates to a chuck for attaching a tool to the spindle of a machine tool, which chuck comprises a chuck barrel having a conical outer peripheral surface, a clamp ring fitted over said conical outer peripheral surface, and a number of needle rollers interposed between the opposed surfaces of said clamp ring and chuck barrel and inclined at a fixed angle with respect to the generating lines of the chuck barrel, so that when the clamp ring is rotated clockwise or couterclockwise around the axis of the chuck barrel, the needle rollers spirally revolve while being guided on said conical outer peripheral surface and while rotating around their own axes, thereby causing the contraction and configurational restoration of the chuck barrel for effecting the gripping and releasing of the tool.

This known chuck construction is superior in that since the contraction of the chuck barrel extends over a wide range where the needle rollers are disposed, the gripping of the tool is not localized and that the machining operation is easy since there is no need to provide slots cut in the chuck barrel extending along the generating lines thereof or provide a guide thread cut in the chuck barrel for threadedly guiding the clamp ring. According to said chuck construction, since the chuck barrel is not provided with slots extending along the generating lines thereof as described above and is of the type in which the force of contraction of the constituent material of the chuck barrel itself upto its elastic limit has to be relied upon to grip the tool, it is necessary to make the wall of the chuck barrel as thin as possible so as to obtain the necessary and sufficient force of contraction. For this reason, the chuck barrel in said chuck construction is believed to have a thin wall. Moreover, since the chuck barrel is designed to have a considerably smaller diameter than the holder and axially extend as an elongated body, when the conical outer peripheral surface of the chuck barrel is clamped by the clamp ring to contract the chuck barrel, the thin wall of the chuck barrel results in a radial flection deformation developing in the chuck barrel at its base portion, which is liable to cause chattering or rapid vibration during cutting operation.

Further, in the chuck construction described above, the clamp ring fitted over the outer peripheral surface of the chuck barrel is exposed to the outside on the radially directed outer peripheral surface thereof. In other words, it is devoid of means for preventing the deformation of the clamp ring as the latter tends to radially outwardly expand. As a result, when the clamp ring is manipulated for rotation to contract the chuck barrel so as to grip the tool, the reaction to such contraction causes the clamp ring to radially outwardly expand, thus making it impossible to maintain the tool in a firmly gripped condition. Further, since the outer peripheral surface of the clamp ring is exposed to the outside, as described above, the rigidity of the entire chuck in the radial direction is low. If, however, the wall thickness of the chuck barrel is increased with a view to increasing said rigidity, this would make it difficult for the chuck barrel to contract, leading to a decrease in the power of gripping the tool. Therefore, the wall thickness of the chuck barrel must as small as possible while aiming to increase the radial rigidity of the entire chuck and prevent the chuck barrel from developing a flection deformation during the contraction thereof and also from developing a radially outwardly expanding deformation. This is an important requirement for improvement of the durability of the tool and the accuracy of machining by the tool and is an indispensable condition for acquirement of a sufficiently firm grip to enable the tool to endure a heavy cutting operation on particularly hard materials and heavy large-sized work.

SUMMARY OF THE INVENTION

The present invention relates to a chuck for machine tools designed to solve these problems. Objects of the invention are: first, to provide a chuck wherein the wall of the chuck barrel is made as thin as possible to facilitate the contraction thereof while increasing the radial rigidity of the chuck including said chuck barrel, thereby preventing the flection deformation of the chuck barrel; secondly, to provide a chuck wherein the clamp ring fitted over the chuck barrel is prevented from developing a radially outwardly expanding deformation; thirdly, to provide a chuck for machine tools wherein the grip on the tool is increased to prevent the occurrence of chattering or rapid vibration of the tool during machining operation.

BRIEF DESCRIPTION OF THE DRAWINGS

FIGS. 1–3 illustrate a basic embodiment of the present invention, wherein FIG. 1 is a front view of an entire chuck attached to the spindle of a machine tool; FIG. 2 is a front view, in longitudinal section, of the chuck in its assembled condition; and FIG. 3 is an exploded perspective view of the chuck.

FIGS. 4–5 illustrate a modification of the chuck for machine tools according to the present invention, wherein FIG. 4 is a view corresponding to FIG. 2, being a front view, in longitudinal section, of an entire chuck; and FIG. 5 is a view corresponding to FIG. 3, being an exploded perspective view of the chuck.

DESCRIPTION OF THE PREFERRED EMBODIMENTS

Figure 1:
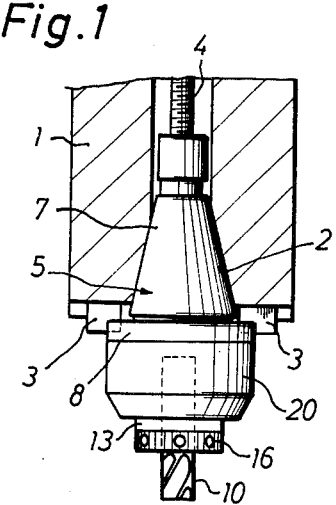
Figure 2:
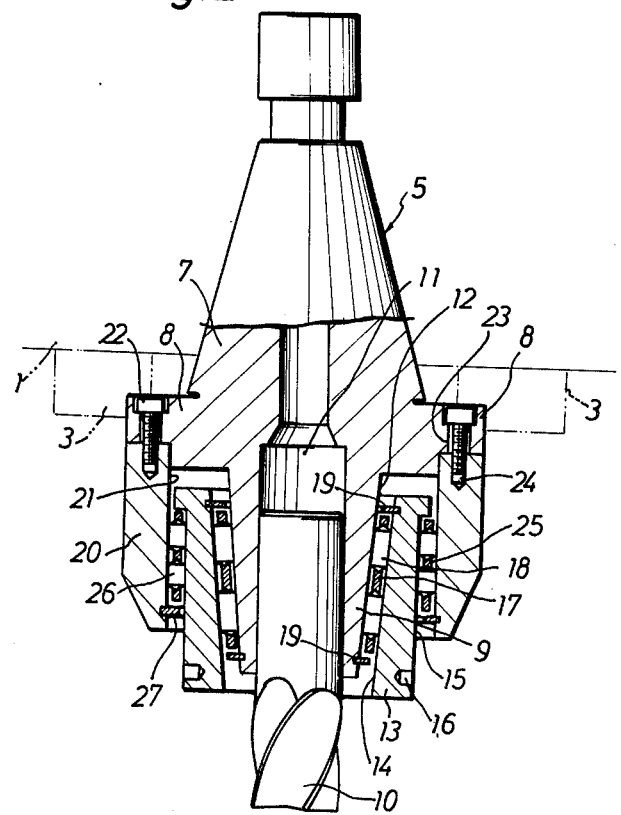
Figure 3:
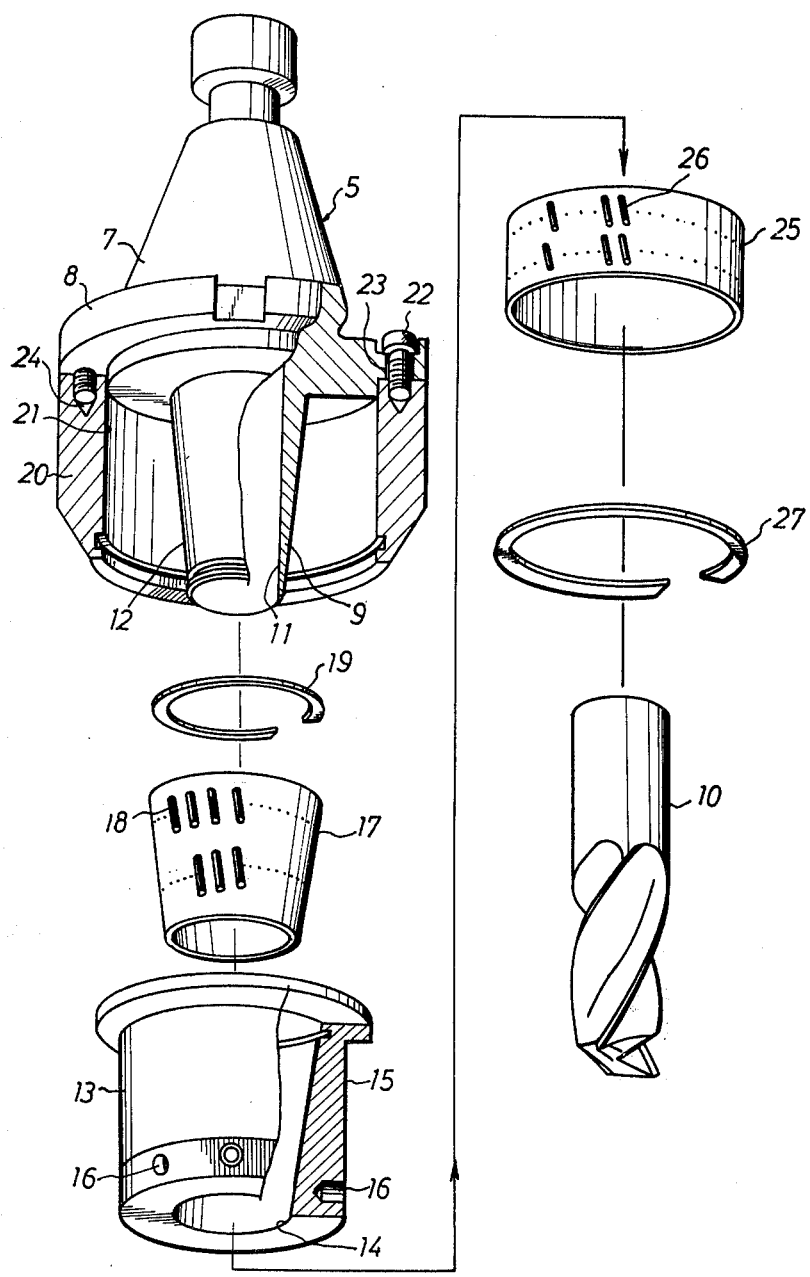

Referring to FIGS. 1–3 illustrating a basic embodiment of the present invention, 1 designates the spindle of a machine tool such as a milling machine and 2 designates a chuck receiving port provided at the front end of said spindle, wherein a chuck to be later described, particularly the holder portion thereof is fitted in said port and fixed in position by a clamp bolt 4 cooperating with stops 3, whereby a transmission of predetermined torque is made possible. Designated at 5 is a chuck body made of a metal material, preferably an iron steel with a high degree of hardness and having an outer peripheral shape conforming to the chuck receiving port 2, said chuck body comprising three parts, namely, a holder 7 having a threaded hole for threadedly receiving the clamp bolt, a flange 8 extending laterally from the base end portion of the holder 7, and a chuck barrel 9 axially projecting from the central portion of the flange 8. The chuck barrel 9 is provided with a cavity 11 for receiving an end mill or other tool, but it is not provided with any slots extending along the generating line thereof. Thus, it is of the type in which the force of contraction of its constituent metal up to elastic limit is utilized to grip a tool 10 inserted in said cavity. The outer peripheral surface 12 of the chuck barrel 9 is in the form of a cone tapering from its base end ajoining the flange 8 toward its front end. On the other hand, the inner peripheral surface of the chuck barrel 9 defining said cavity 11 is not tapered, i.e., it is straight.

A clamp ring 13 is fitted over the outer peripheral surface 12 of the chuck barrel 9 and has a conical inner peripheral surface 14 which corresponds to the conical shape of the outer peripheral surface 12 of the chuck barrel 9 and which, therefore, has the same angle of inclination as the surface 12, said clamp ring being adapted to be rotated around the outer peripheral surface 12 of the chuck barrel 9. In the basic embodiment, this rotation is effected by providing the straight outer peripheral surface 15 of the clamp ring 13 with a number of clamp holes 16 and inserting a bar-like tool, such as a wrench, into a clamp hole 16 and then manipulating the tool to rotate the clamp ring 13.

Designated at 17 is a first conical retainer interposed between the conical outer peripheral surface 12 of the chuck barrel 9 and the conical inner peripheral surface 14 of the clamp ring 13 and having fitted therein a number of rollable bodies 18, or needle rollers arranged in rows and inclined at a fixed angle with respect to the generating lines of the clamp ring, said rollable bodies being in contact with the outer peripheral surface 12 of the chuck barrel 9 on the inside and with the inner peripheral surface 14 of the clamp ring 13 on the outside, thus establishing the so-called rolling contact condition. More particularly, the rollable bodies 18 are rotated around their own axes between the conical outer peripheral surface 12 of the chuck barrel 9 and the conical inner periphral surface 14 of the clamp ring 13 and simultaneously revolve around the axis of the chuck while being guided in a spiral direction since the axes of the rollable bodies are inclined at a fixed angle with respect to the generating lines of the first retainer (which coincides with the generating lines of the chuck barrel 9 and clamp ring 13). Designated at 19 are stop rings projecting from the chuck barrel 9 or clamp ring 13 so as to prevent the first retainer 17 from being separated along the generating lines thereof.

Designated at 20 is a restraining ring disposed so as to surround the outer peripheral surface 15 of the clamp ring 13, the inner peripheral surface 21 of said restraining ring being shaped straight corresponding to the straight outer peripheral surface 15 of the clamp ring 13. The restraining ring 20 functions to increase the radial rigidity of the chuck itself so as to prevent the chuck barrel 9 from developing a flection deformation when the chuck barrel is radially contracted through the rollable bodies by rotating the clamp ring 9 to grip the tool 10. It also serves to prevent the clamp ring from radially outwardly expanding under the reaction to the contracton of the chuck barrel 9, and it is immovably assembled to the chuck body 5, particularly to the flange 8 thereof by means of a number of attaching bolts 22. Thus, designated at 23 are a number of bolt holes formed in the flange 8 at radial positions thereon and 24 are a number of threaded holes formed in the restraining ring 20 at positions corresponding to the bolt holes 23. The attaching bolts 22 are screwed into the threaded holes 24 through the bolt holes 23, thereby fixing the restraining ring 20 to the flange 8 of the chuck body 5.

A second cylindrical retainer 25 is interposed between the straight inner peripheral surface 21 of the restraining ring 20 and the straight outer peripheral surface 15 of the clamp ring 13 and has fitted therein a numberal of rollable bodies 26, preferably needle rollers arranged in rows and inclined at a fixed angle with respect to the generating lines of the retainer 25. In the case, as in FIGS. 2 and 3, where needle rollers are employed as rollable bodies 26 making rolling contact with the restraining ring 20 and clamp ring 26, the angle of inclination of the rollable bodies 26 in the second retainer 25 occupying the radially outward position is made greater than the angle of inclination of the rollable bodies 18 in the first retainer 17 occupying the inward position with the difference in the radius between the first and second retainers 17 and 25 taken into consideration, in order to assure that the rollable bodies 26 in the form of needle rollers in the second retainer 25 will be moved in the radial direction the same amount as the rollable bodies 18 in the form of needle rollers in the first retainer 17. In addition, designated at 27 is a stop ring projecting from the clamp ring 13 or restraining ring 20 for preventing the separation of the second retainer 25.

The operation of gripping the tool 10 inserted in the cavity 11 of the chuck barrel 9 in performing the machining operation will now be described.

Assume that the rollable bodies 18 and 26 fitted in the first and second retainers 17 and 25 are inclined at such an angle of inclination that, as shown in FIG. 3, their base ends are disposed more leftward than their front ends with respect to their associated generating lines, as viewed from the ouside of the retainer 17 or 25. When the clamp ring 13 is rotated clockwise as viewed in FIG. 2, the rollable bodies 18 in the first retainer 17 are rotated around their own axes in a direction perpendicular to their respective axes while revolving around the axis of the chuck in the spiral direction to ascend the conical outer peripheral surface 12 of the chuck barrel 9. This operation results in the chuck barrel 9 being forced to be radially contracted, thus firmly gripping the shank of the tool 10.

The chuck barrel 9 itself is not provided with slots extending along the generating lines thereof and is of the type in which the constituent metal material thereof alone grips the tool, so that it contractedly deforms until the elastic limit of the metal material is reached, thereby firmly gripping the shank of the tool 10 in the cavity 11. In this connection, when the chuck barrel 9 is contracted, it tends to develop a deflection deformation at the root portion thereof and there is the danger of the clamp ring 13 expansively deforming radially outward as it is acted upon by the reaction to the contraction of said chuck barrel 9. According to the present invention employing the arrangement described above, however, since the restraining ring 20 surrounding the outer peripheral surface 15 of the clamping ring 20 is assembled to the outer peripheral surface 15, the expansive deformation of the clamp ring 13 is prevented by the restraining ring 20, thus making it possible to maintain a firm grip on the tool 10 without the danger of the contraction force of the chuck being decreased.

In addition to the fact that the restraining ring 20 prevents the expansive deformation of the clamp ring 13, as described above, since the restraining ring itself surrounds the outer peripheral surface 15 of the clamp ring 13 and is assembled to the chuck body, particularly the flange 8 thereof, even if the wall thickness of the chuck barrel 9 is reduced, the radial rigidity of the entire chuck including the chuck barrel can be increased, thereby preventing the deflection deformation of the chuck barrel 9 as it is contracted. In this sense also, a firm grip on the tool can be maintained.

Further, the fact that the restraining ring 20 is assembled so as to surround the outer peripheral surface 15 of the clamp ring 13 provides a dust-proofing effect for the two retainers 18 and 26. In addition, when the clamp ring 13 is rotated in the opposite direction, or counterclockwise, the rollable bodies roll while descending the tapered conical outer peripheral surface 12 of the chuck barrel 9 to allow the chuck barrel, which has been contracted, to restore its original shape, so that the tool 10 can, of course, be easily extracted from within the cavity 11.

Figure 4:
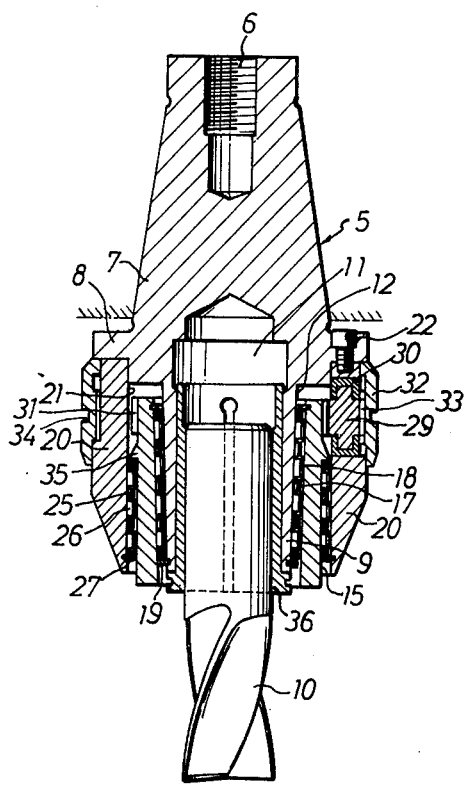
Figure 5:
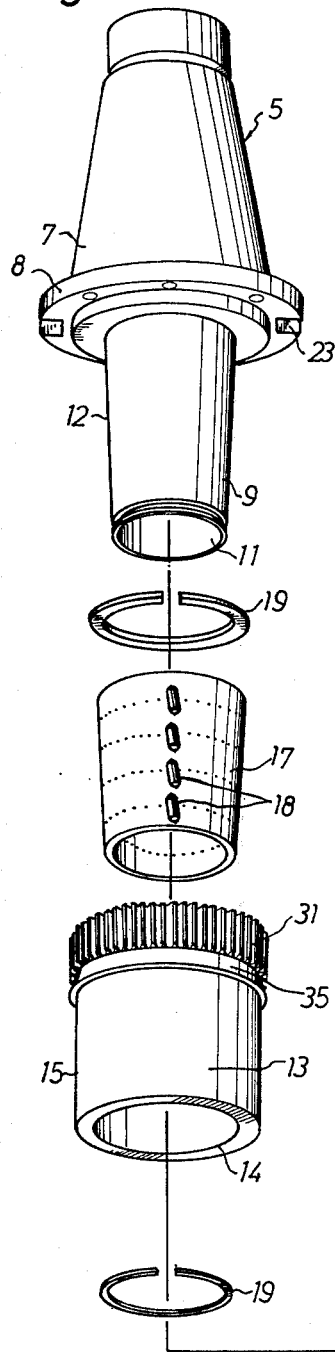
Figure 5:
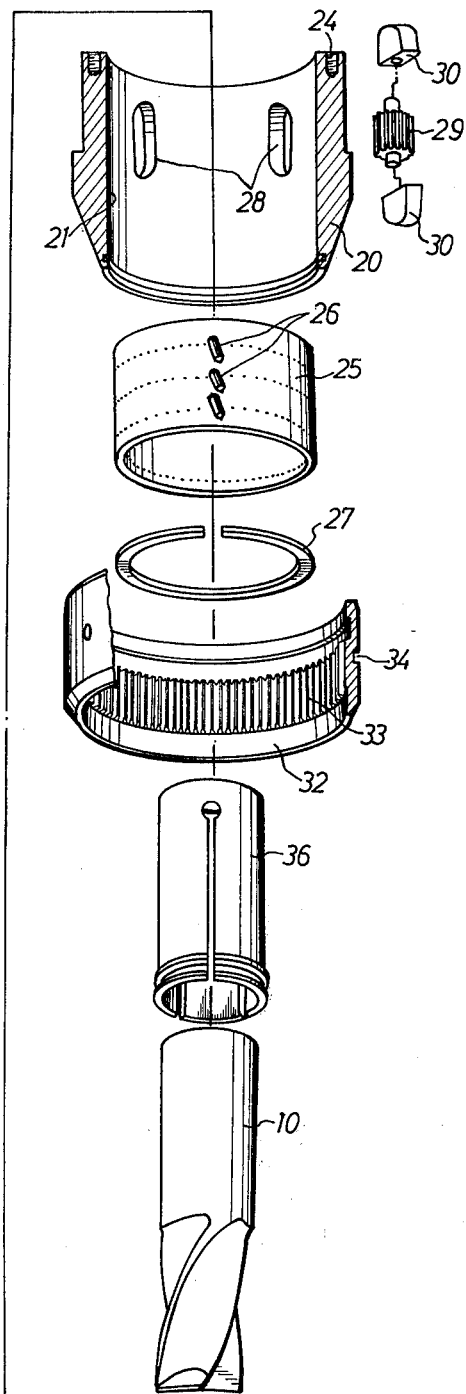

A chuck construction according to the present invention shown in FIGS. 4 and 5 is the same as the above-described basic embodiment shown in FIGS. 1-3, except the mechanism for rotating the clamp ring 13. Thus, with the repetition of the same description avoided, the parts in FIGS. 4 and 5 are given the same reference characters as those of the corresponding parts in FIGS. 1-3. Whereas in the basic embodiment shown in FIGS. 1-3 the type has been shown in which the clamp ring 13 is directly rotated, in the modified embodiment shown in FIGS. 4-5 the clamp ring 13 is adapted to be indirectly rotated by specially constructing the restraining ring in the manner to be presently described.

In FIGS. 4 and 5, designated at 28 are openings formed in the restraining ring 20 and being elongate, extending parallelly to the axis of the restraining ring 20. Designated at 29 is a pinion rotatably fitted in each opening 28 and supported by a pair of holder pieces 30 fixed in the opening 28. Designated at 31 is a gear formed in part of the outer peripheral surface 15 of the clamp ring 13 and permanently meshing with said pinions 29. Designated at 32 is an operating ring rotatably fitted over the outer peripheral surface of the restraining ring and internally formed with a gear 33 which is opposed to and permanently meshes with said pinions 29. Designated at 34 are clamp holes formed in the outer peripheral surface of said operating ring and adapted to perform the same function as the clamp holes 16 in the basic embodiment shown in FIGS. 1-3. In addition, 35 designates a stop piece projecting from the outer peripheral surface 15 of the clamp ring 13 so as to prevent the separation of the second retainer 25, and 36 desingates a collect mounted in the cavity 11 in the chuck barrel 9.

In this modification constructed in the manner described above, when the operating ring 32 is rotated, the meshing relation between the gear 33 of the operating ring 32 and the pinions 29 and between the pinions 29 and the gear 31 of the clamp ring 13 causes the rotation of the clamp ring 13 in the same manner as in the basic embodiment shown in FIGS. 1-3, so that the contraction and configurational restoration of the chuck barrel 9 can be achieved through the rotation of the rollable bodies 18 in the first retainer 17 around their own axes and the revolution thereof around the axis of the chuck as they spirally move on the conical outer peripheral surface 12 of the chuck barrel 9. In such arrangement also wherein the operating ring 32 is incorporated into the restraining ring 20, since there is no change in the arrangement in the sense that the restraining ring 30 is assembled to the clamp ring 13 so as to surround the outer peripheral surface 15 thereof, the same intended function and effect as in the basic embodiment shown in FIGS. 1-3 can be achieved. However, the mechanism described above in which the clamp ring 13 is indirectly rotated through the clamp ring 32 is more advantageous in that the intended contracting force can be easily obtained with a light rotative operation and a small clamping force through the rotation of the pinions 29 contained in the restraining ring 20. In this connection, it is to be noted that by designing the gear 33 on the operating ring 32 to have a greater number of teeth than that of the gear 31 on the clamp ring 13, it would also be possible to double the angle of rotation of the clamp ring 13 around its own axis to make easier the contraction and configurational restoration of the chuck barrel 9.

In brief, in the chuck construction according to the present invention, since the restraining ring 20 surrounding the outer peripheral surface 15 of the clamp ring 13 is assembled thereto, it prevents the radially outwardly expanding deformation of the clamp 13 under the force of contraction of the chuck barrel 9 exerted when the latter is contracted, and also it increases the radial rigidity of the entire chuck including the chuck barrel 9, whereby the phenomenon of the chuck barrel flexing upon contraction can also be eliminated. This means that the chuck barrel 9 of the type adapted to grip the tool 10 solely by the elastic deformation of the metal material of the chuck barrel can be decreased in its wall thickness as much as possible to provide a sufficiently firm grip to prevent chattering or rapid vibration of the tool 10 during machining operation.

What is claimed is:

1. A chuck for machine tools comprising a chuck body consisting of a holder adapted to be set in the chuck receiving port of a machine tool, a chuck barrel extending from and integral with said holder and having an outer peripheral surface tapered in the direction of said extension, said chuck barrel having a tool receiving bore for receiving a tool therein, a clamp ring fitted over the outer peripheral surface of said chuck barrel and adapted to be manipulated for rotation; rollable bodies consisting of a group of needle rollers interposed between said clamp ring and the outer peripheral surface of said chuck barrel, said needle rollers being circumferentially disposed with their axes inclined at a fixed angle with respect to the axis of the chuck barrel; the arrangement being such that when said clamp ring is manipulated for rotation, said rollable bodies rotate around their own axes while spirally revolving around the axis of said chuck barrel on the conical outer peripheral surface thereof, thereby causing the chuck barrel to be elastically contracted or restored to its original state, thereby firmly gripping or relasing the shank of the tool fitted in the cavity of the barrel, said chuck being characterized in that it further comprises a restraining ring shaped to surround the outer peripheral surface of said clamp ring, said restraining ring being firmly secured to the base and of the holder of the chuck body so as to circumferentially surround the outer peripheral surface of the clamp ring, and rollable bodies consisting of a group of needle rollers circumferentially arranged between the inner peripheral surface of the restraining ring and the outer peripheral surface of the clamp ring, the arrangement being such that the radially outwardly directed expansive deformation of the clamp ring under the reaction of the chuck barrel, when the latter is elastically contracted in order to grip the tool, is shared and restrained by said restraining ring.

2. A chuck for machine tools comprising a chuck body consisting of a holder adapter to be set in the chuck receiving port of a machine tool, and a chuck barrel extending from and integral with said holder and having an outer peripheral surface tapered in in the direction of said extension, said chuck barrel having a tool receiving bore for receiving a tool therein; a clamp ring fitted over the outer peripheral surface of said chuck barrel and adapted to be manipulated for rotation, rollable bodies consisting of a group of needle rollers interposed between said clamp ring and the outer peripheral surface of said chuck barrel, said needle roller being circumferentially disposed with their axes inclined at a fixed angle with respect to the axis of the chuck barrel; the arrangement being such that when said clamp ring is manipulated for rotation, said rollable bodies rotate around their own axes while spirally revolving around the axis of said chuck barrel on the conical outer peripheral surface thereof, thereby causing the chuck barrel to be elastically contracted or restored to its original state, thereby firmly gripping or releasing the shank of the tool fitted in the cavity of the barrel, said chuck being characterized in that it further comprises a restraining ring shaped to surround the outer peripheral surface of said clamp ring, said restraining ring being firmly secured to the base end of the holder of the chuck body so as to circumferentially surround the outer peripheral surface of the clamp ring, rollable bodies consisting of a group of needle rollers circumferentially arranged between the inner peripheral surface of the restraining ring and the outer peripheral surface of the clamp ring, a rotatable operating ring fitted over the outer peripheral surface of said restraining ring, pinions rotatably installed in the restraining ring and meshing with a gear formed on the outer peripheral surface of said clamp ring and also with a gear formed on the inner peripheral surface of said operating ring, said operating ring being rotated so that the clamp ring is indirectly rotated, the chuck barrel for gripping the tool being capable of being elastically contracted or restored to its original state, the arrangement being such that the radially outwardly directed expansive deformation of the clamp ring under the reaction of the chuck barrel when the latter is elastically contracted in order to grip the tool, is shared and restrained by said restraining ring.

3. The chuck as set forth in claim 1, characterized in that the rollable bodies interposed between the restraining ring and the clamp ring have their needle roller axes inclined at a fixed angle with respect to the axis of the chuck barrel and that the angle of inclination thereof is greater than the angle of inclination at which the rollable bodies consisting of a group of needle rollers interposed between the chuck barrel and the clamp ring have their axes inclined with respect to the axis of the chuck barrel.

4. The chuck as set forth in claim 1, characterized in that in assembling the restraining ring to the chuck body so as to surround the outer peripheral surface of the clamp ring, said restraining ring is fixed to the flange of the chuck body by means of attaching bolts inserted into threaded holes formed in the restraining ring and bolt holes formed in the flange of the chuck body at positions corresponding to those of said threaded holes.

5. The chuck as set forth in claim 2, characterized in that the rollable bodies interposed between the restraining ring and the clamp ring have their needle roller axes inclined at a fixed angle with respect to the axis of the chuck barrel and that the angle of inclination thereof is greater than the angle of inclination at which the rollable bodies consisting of a group of needle rollers interposed between the chuck barrel and the clamp ring have their axes inclined with respect to the axis of the chuck barrel.

6. The chuck as set forth in claim 2, characterized in that in assembling the restraining ring to the chuck body so as to surround the outer peripheral surface of the clamp ring, said restraining ring is fixed to the flange of the chuck body by means of attaching bolts inserted into threaded holes formed in the restraining ring and bolt holes formed in the flange of the chuck body at positions corresponding to those of said threaded holes.

* * * * *